United States Patent [19]

Thomas et al.

[11] Patent Number: 4,697,185
[45] Date of Patent: Sep. 29, 1987

[54] ALGORITHM FOR RADAR COORDINATE CONVERSION IN DIGITAL SCAN CONVERTERS

[75] Inventors: David M. Thomas, Ottawa; Leonard J. Tubb, Kanata, both of Canada

[73] Assignees: Her Majesty the Queen in right of Canada, as represented by the Minister of National Defence; Control Data Canada, Ltd., both of Ottawa, Canada

[21] Appl. No.: 510,251

[22] Filed: Jul. 1, 1983

[30] Foreign Application Priority Data

Dec. 23, 1982 [CA] Canada .................................. 418525

[51] Int. Cl.⁴ ............................................... G01S 7/44
[52] U.S. Cl. ..................................... 342/185; 364/731
[58] Field of Search ............... 343/55 C, 185; 364/731

[56] References Cited

U.S. PATENT DOCUMENTS

| | | | |
|---|---|---|---|
| 3,671,723 | 6/1972 | Deligniers et al. | 364/731 |
| 4,106,021 | 8/1978 | Katagi | 364/731 |
| 4,275,415 | 6/1981 | Engle | 343/55 C |
| 4,547,803 | 10/1985 | Richards | 343/55 C |

FOREIGN PATENT DOCUMENTS 1103345  6/1981  Canada .............................. 343/55 C Primary Examiner—T. H. Tubbesing
Assistant Examiner—Gilberto Barrón, Jr.
Attorney, Agent, or Firm—Stevens, Davis, Miller & Mosher

[57] ABSTRACT

Disclosed is a system for high speed conversion of radar formats from polar coordinates to cartesian coordinates. From an initial address $X_iY_i$ where a radar pulse crosses a display, subsequent addresses are determined by adding constant values $\sin \theta_i$ and $\cos \theta_i$ to $X_i$ and $Y_i$. This is faster than the prior method of calculating $x_i$ and $Y_i$ by multiplying $R_i$ (range) by $\sin \theta_i$ and $\cos \theta_i$. Also disclosed is a system for filling the display between adjacent radials at long ranges where spoking of the display tends to occur. This is done by adding constant increments to one cartesian value on one vector until the next vector is reached while maintaining the other cartesian value constant.

6 Claims, 9 Drawing Figures

ALGORITHM FOR RADAR COORDINATE CONVERSION IN DIGITAL SCAN CONVERTERS

FIELD OF THE INVENTION

This invention relates to high speed coordinate conversion of radar formats.

BACKGROUND OF THE INVENTION

In a digital scan converter, radar video signals are quantized by an analog to digital converter. The quantized signals are written into a large digital memory, organized in an X,Y addressing scheme by coordinate conversion logic which converts the polar coordinate system of the radar into the cartesian coordinate system of the memory. The memory is then scanned at 60 Hz to refresh a TV monitor.

The location of a radar pulse return may be defined, in polar coordinates, by $R_i \theta_i$, where $R_i$ is a measure of range and $\theta_i$ is the azimuth angle of the radar antenna at the time of sampling. The function of the coordinate converter is to compute the corresponding $X_i Y_i$ addresses of each pulse return (sample) and write the sample into the correct location in the TV refresh memory.

In practice, this process is subject to certain problems. One problem is that, near the origin, the azimuthal resolution of the radar is greater than that of the display and returns from adjacent radar pulses at the same range map (convert) into the same X,Y location.

Another problem is that, at long ranges, the radar resolution is less than the display. If not compensated for, this will result in portions of the display memory not being loaded with sampled data, creating "spoking" or pinholes in the display.

Furthermore, this spoking will give rise to cluttering of the display with stale information from many previous radar scans, since tolerances on the antenna pointing angle and arithmetic rounding errors will result in different memory locations being addressed every scan.

At intermediate ranges, when the resolutions of the radar and display are equal, there will be a 1 to 1 mapping of samples defined in the two coordinate systems.

The coordinate conversion requirements are therefore:

(a) For every $R_i \theta_i$, compute the equivalent $X_i Y_i$ (b) For samples near the origin, establish which of many samples should be written into $X_i Y_i$ (c) For samples far from the origin, ensure that each display picture cell (pixel) is addressed and loaded with sensible data.

With regard to item (a) above, the standard equations to convert from polar coordinates to cartesian coordinates are:

$$X_i = R_i \sin \theta_i \quad (1)$$

$$Y_i = R_i \cos \theta_i \quad (2)$$

It can be seen that each transformation requires two multiplications. For a 20 RPM, 5 kHz radar, there are $60/20 \times 5 \times 10^3 = 15{,}000$ radar pulses per scan. For a 1000 line resolution TV raster, with the radar in the center of the display, this results in $75 \times 10^5$ range samples. The maximum time available for each multiplication is therefore $1/2 \times 75 \times 10^5 = 66$ nsec. The hardware required to do this is extremely costly and requires a large amount of physical space.

SUMMARY OF THE INVENTION

One object of the present invention is to compute the real time cartesian coordinates of the radar samples with a small amount of hardware. As will be further discussed below, this is accomplished by a differential technique whereby the high speed multiplication requirement is replaced by a high speed addition requirement, which is very much easier to implement.

With regard to item (b) above, a cell to word buffer can be used between the coordinate converter and the refresh memory which allows address comparison and data peak detecting.

With regard to (c) above, the invention provides a "fill" procedure between radar pulses at ranges at which spoking tends to occur, as will be explained below.

According to a broad aspect of the invention there is provided a system for high speed conversion of polar coordinates of radar returns into cartesian coordinates for storage in a digital memory comprising means for determining an initial $X_i, Y_i$ address where a radar pulse crosses a raster display at an angle $\theta_i$, and means for determining subsequent addresses $X_{i+1}$ and $Y_{i+1}$ by adding constant values $\sin \theta_i$ and $\cos \theta_i$ to $X_i$ and $Y_i$.

BRIEF DESCRIPTION OF THE DRAWINGS

The invention will now be further described in conjunction with the accompanying drawings, in which.

DETAILED DESCRIPTION OF THE INVENTION

Figure 1:
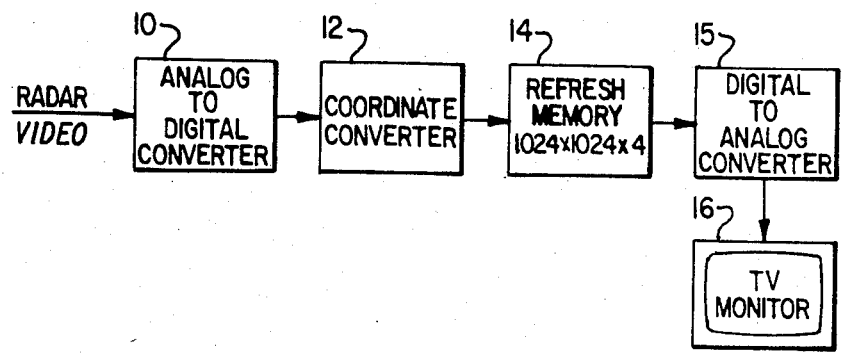
FIG. 1 is a block diagram of a radar scan converter.

The functional block diagram of a digital radar scan converter is shown in FIG. 1. Radar video signals (pulse echo returns) are quantized by an analog to digital converter 10. These quantized samples are written into a large digital memory 14, organized in an X,Y addressing scheme, by the coordinate converter 12 which converts the polar coordinate system of the radar into the cartesian system of the refresh memory 14. The refresh memory is then scanned at 60 Hz, converted to analog signals by digital to analog converter 15, and used to refresh the display on TV monitor 16.

Figure 2:
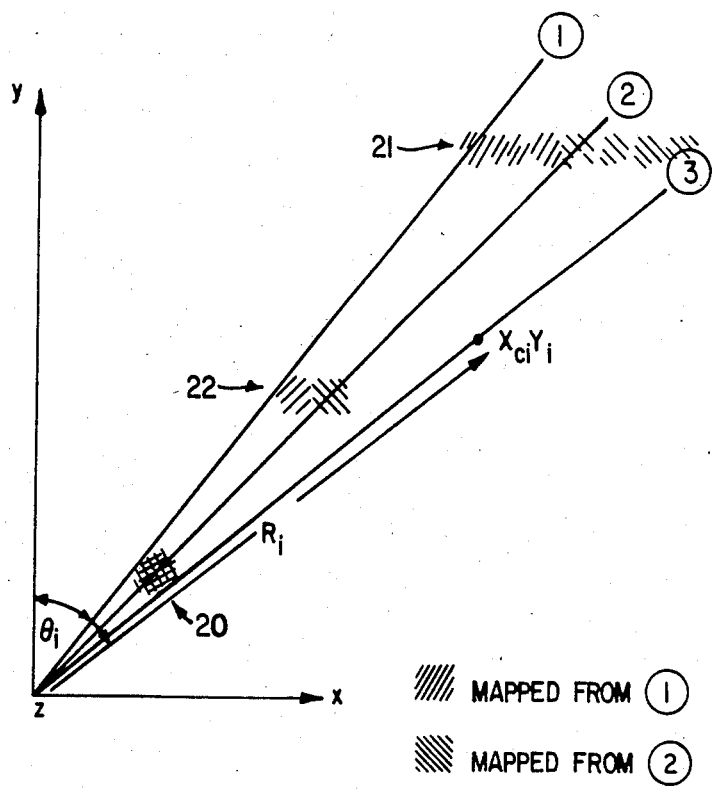
FIG. 2 is a diagram for explaining problems encountered in the coordinate conversion process.

The essential requirements of the coordinate conversion process are shown in FIG. 2. Returns from three sequential radar pulses are shown by radials 1, 2 and 3. Samples along each of these radials have addresses $R_i \theta_i$ where $R_i$ is a measure of range and $\theta_i$ is the azimuth angle of the radar antenna at the time of the sampling. The function of the coordinate converter 12 (FIG. 1) is to compute the corresponding $X_i Y_i$ addresses of each sample and write the sample into that location of the TV refresh memory.

An examination of FIG. 2 shows that the procedure is subject to certain problems, however. Near the origin, the azimuthal resolution of the radar is greater than that of the TV display and returns from adjacent radar pulses at the same range map into the same X,Y location as indicated at 20. Conversely, at long ranges such as indicated at 21, the radar resolution is less than the display and, if not compensated for, this will result in portions of the display memory not being loaded with sampled data, creating "spoking" or pinholes in the display. Furthermore, this spoking will give rise to cluttering of the display with stale information from many previous radar scans, since tolerances on the antenna pointing angle and arithmetic rounding errors will result in different memory locations being addressed every scan. In between these extremes, as indicated at 22, the resolutions of the radar and display are equal, resulting in a 1 to 1 mapping of samples defined in the two coordinate systems.

The coordinate conversion requirements are thus as set forth previously.

The conventional solution to the problem of having to make a large number of transformations (initial address generation) in a short time has been to reduce the resolution of the system. If the pulse repetition frequency and the number of display lines are reduced, the number of samples per scan and hence the arithmetic rate drop pro rata. Both of these solutions result in loss of radar display resolution with consequent reductions in the capability of the system to resolve groups of close targets and position them accurately relative to other returns or a synthetic reference point.

The present invention uses a differential technique which does not cause any reduction in display performance. Differentiating equations (1) and (2) above, we obtain:

$$\Delta X_i = \Delta R_i \sin \theta_i \quad (3)$$

$$\Delta Y_i = \Delta R_i \cos \theta_i \quad (4)$$

Now $\Delta R_i$ is the incremental change in range which is defined by the range address and is equal to 1. Therefore:

$$X_{i+1} = X_i + \sin \theta_i \quad (5)$$

$$Y_{i+1} = Y_i + \cos \theta_i \quad (6)$$

Therefore, given an initial X and Y position where the radial first crosses the display raster, subsequent addresses may be computed by adding a constant (cos $\theta_i$ or sin $\theta_i$) for that particular radar pulse. The high speed multiplication requirement has therefore been replaced by a high speed addition requirement, which is very much easier to implement. Effectively, an addition can be done in 1/N th the time of a multiplication, where N is the number of bits in the word.

Item (b) referred to above is known as collapsing loss and the question arises as to which of the many samples mapping to the same point takes precedence. There are several possible alternatives:
 (a) the first sample wins,
 (b) the last sample wins,
 (c) the samples are averaged,
 (d) the largest sample wins,
 (e) the smallest sample wins.

Figure 3:
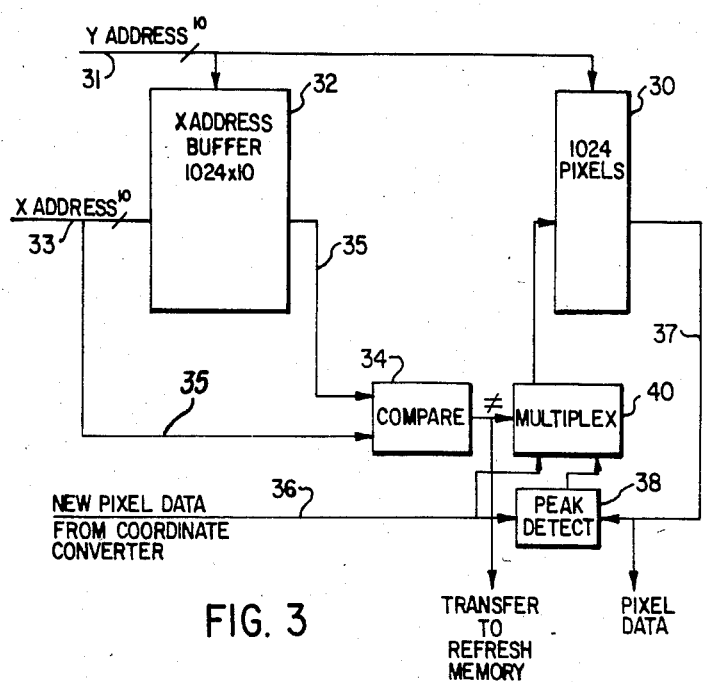
FIG. 3 is a block diagram of an arrangement for solving the problem of collapsing loss.

To avoid losing point targets, option (d) is required, i.e. the samples must be peak detected. The approach to this problem involves the use of a cell to word buffer between the coordinate converter and the refresh memory to provide temporary data and address storage to allow address comparison and data peak detecting. The principle may be seen from FIG. 3 wherein a single pixel memory 30 is provided which is 1024 words deep. Each relevant radar sample is stored in memory 30 at its associated Y address on line 31 and the X address is stored in buffer 32. Each new X address on line 33 is compared at 34 with the old contents of memory 32 at the same Y address, the old address appearing on line 35. If the X addresses are found to be the same, the new pixel sample on line 36 and the old pixel sample on line 37, at the same Y address, are compared in peak detect circuit 38 and the largest is written back into the pixel memory 30 via multiplex circuit 40. If the X addresses differ, the contents of the pixel memory is passed to the refresh memory (not shown) and the next pixel sample is loaded in the pixel memory.

As regards spoking, the reason for it is that the spatial resolution of the radar is worse than the resolution of the display at long ranges. This is caused by one of two factors, the angular spacing of adjacent radar pulses caused by antenna rotation, or the resolution to which the antenna position is defined by the azimuth change pulses (ACPs) of the radar. In either case, if the display resolution is lowered to match that of the radar at the longest range, spoking will not occur. This is an unacceptable option, however, as lowering the display resolution reduces performance in range discrimination and azimuthal discrimination at short ranges. Furthermore, synthetic graphics overlayed on the imagery will be "steppy" or "blocky" and is quite unacceptable compared with stroke writing displays.

Figure 4:
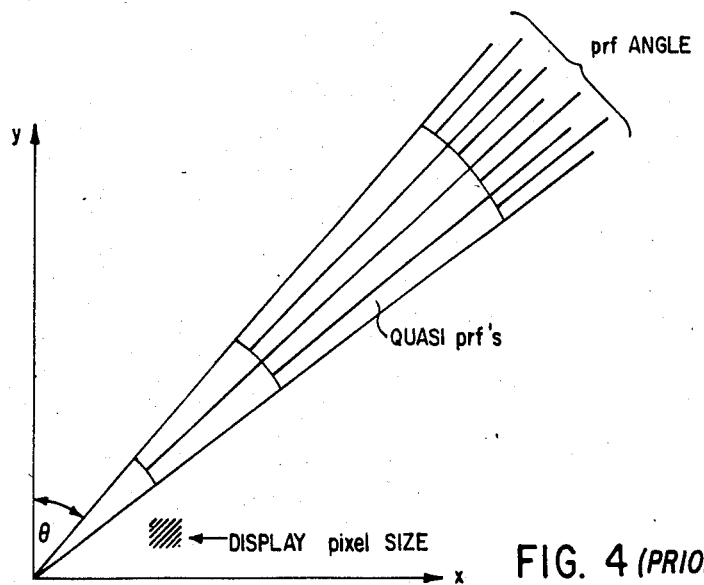
FIG. 4 is a diagram illustrating a prior art technique for solving the problem of display spoking.

The gaps between radar pulses may be filled by creating artificial radar returns as shown in FIG. 4 which shows the angle between two successive pulses as the prf (pulse repetition frequency) angle. A single array of range samples is used until spoking is about to occur, at which point the angle is split into two and a double array used. This continues until spoking again is imminent, at which time the angle is further subdivided, and so on.

There are two basic drawbacks with this approach. The first is that the basic coordinate conversion process (R cos $\theta$, R sin $\theta$ or equivalent) must be performed many more times per inter-pulse period, thereby increasing the computational load (and hence hardware cost) considerably.

The second drawback is that as the angular resolution of the subdivided angle becomes finer, more bits are required in the arithmetic unit computing the addresses. This means that the sin $\theta$ and cos $\theta$ look-up tables must be longer, and the arithmetic unit must manipulate larger words. Conventional look-up tables have words which are 12 bits long, which matches well the angular resolution of most radars (4096 ACPs per scan). Twelve-bit arithmetic can therefore be used. As the angular resolution is increased by these "quasi" prf's, so the word lengths must increase, up to as many as 20 bits (8 subdivisions). Therefore as well as increasing the number of arithmetic operations that must be performed, this technique also increases the word length. Both these factors combine to substantially increase the amount of hardware required.

Figure 5:
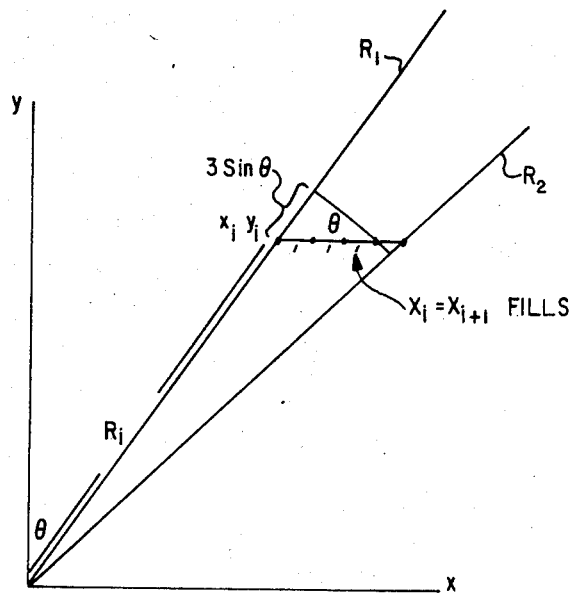
FIGS. 5 and 6 are diagrams useful in explaining the fill procedure of the present invention for solving the problem of spoking.

The manner in which the present invention solves the spoking problem is illustrated in FIG. 5. The X,Y addresses of adjacent samples are computed until a range at which it is known that spoking tends to occur. At this point, the Y address is kept constant and the X address is incremented. At the same time, the address range sample corresponding to this new X,Y address is computed. The following equations describe the process:

$$Y_{i+1} = Y_i \quad (7)$$

$$X_{i+1} = X_i + 1 \quad (8)$$

$$R_{i+1} = R_i + \sin\theta \quad (9)$$

Similarly, of course, $R_{i+n} = R_i + n \sin\theta$ where n is a positive integer, i.e. 1, 2, 3...n.

This "fill" process is continued until the X address overlaps into the next radar pulse space, $R_2$. At this point, the next X,Y address is computed along the radial $R_i$.

Figure 6:
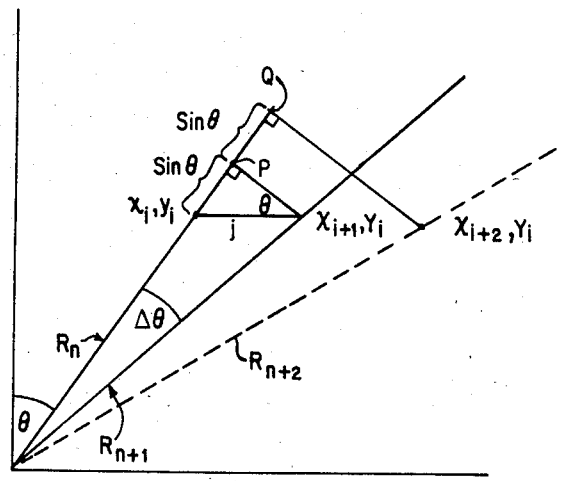

It may be slightly easier to visualize the fill procedure from a consideration of FIG. 6 which shows a single fill step, i.e. from radial $R_n$ to $R_{n+1}$. It will be appreciated that the angle $\Delta\theta$ between $R_n$ and $R_{n+1}$ is greatly exaggerated in FIG. 6 so that the geometrical relationships shown are substantially correct. From FIG. 6 it is easily seen that $\Delta X = 1$ (given) and $\Delta R = \sin\theta$. Therefore $R_{i+1} = R_i + \Delta R = R_i + \sin\theta$.

The video intensity at $X_{i+n}, Y_i$ is obtained from the range buffer address given by adding $R_i$ to n $\sin\theta$ (for azimuth angles less than 45°). For example, the intensity of the pixel at address $X_{i+1}, Y_i$ in FIG. 6 is equal to the intensity of the pixel at point P (i.e. $R + \sin\theta$). Similarly, the intensity at point Q ($X_{i+2}, Y_i$) is equal to $R + 2 \sin\theta$. Thus the video intensity changes smoothly from point to point during filling and does not present a "blocky" appearance as would be caused by abrupt changes.

For azimuth angles less than 45°, the fill operation is in the X direction. Beyond 45°, the fill is performed in the Y direction. This is done to minimize the need for fills. Obviously the same procedure applies in the other 3 quadrants.

Figure 7:
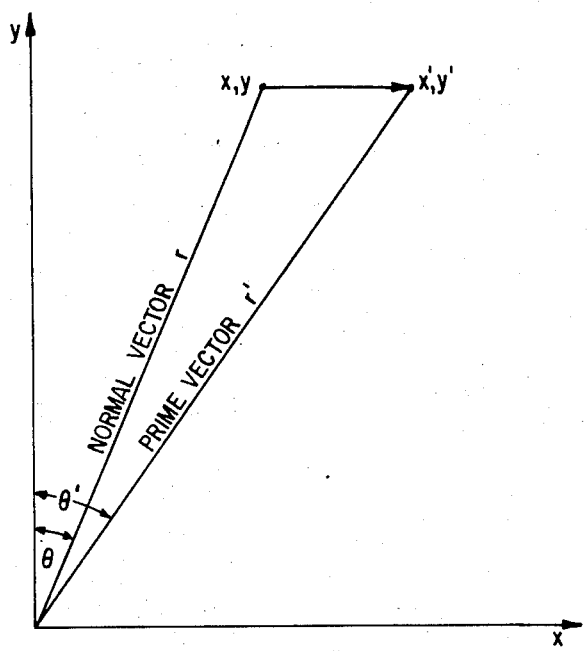
FIG. 7 is a diagram useful in explaining how to determine when the fill procedure is to be terminated.

The procedure used to establish when to stop the fill is illustrated in FIG. 7. The two vectors r and r' corresponding to adjacent radar pulses are called the normal and "prime" vectors. Addresses are computed along the normal vector and filled until the prime vector is reached. In FIG. 6, consider filling from point X,Y to point X',Y'. What is required is the value of X'. From the geometry:

$$Y = Y' \quad (10)$$

Therefore $r \cos\theta = r' \cos\theta' \quad (11)$

Therefore $r' = r \frac{\cos\theta}{\cos\theta'} \quad (12)$

Therefore $X' = r' \sin\theta' \quad (13)$ $$= r \cos\theta \frac{\sin\theta'}{\cos\theta'} \quad (14)$$

$$= r \cos\theta \tan\theta' \quad (15)$$

Now X' may be computed using the same differential technique as discussed above for X and Y, equations (3) to (6), i.e. $X_{i+1'} = X_{i'} + \cos\theta \tan\theta' \quad (16)$ The term $\cos\theta \tan\theta'$ is therefore computed once for each radar pulse. This presents a very low computational load for any conventional computer.

Similarly, for Y fill operations, $Y' = r \sin\theta \cot\theta'$.

During filling from the normal vector to the prime vector the value of "X" for each proposed fill is compared with $X_{i+1'}$ which is one fill unit (in the X-direction) beyond the prime vector. Thus, if $X_{i+n} - X_{i+1'}$ where n is 1, 2, 3...) is not greater than 1, no fill should be made and the next point out along the normal vector should be considered. If the result is greater than 1, a fill should be made.

Figure 8:
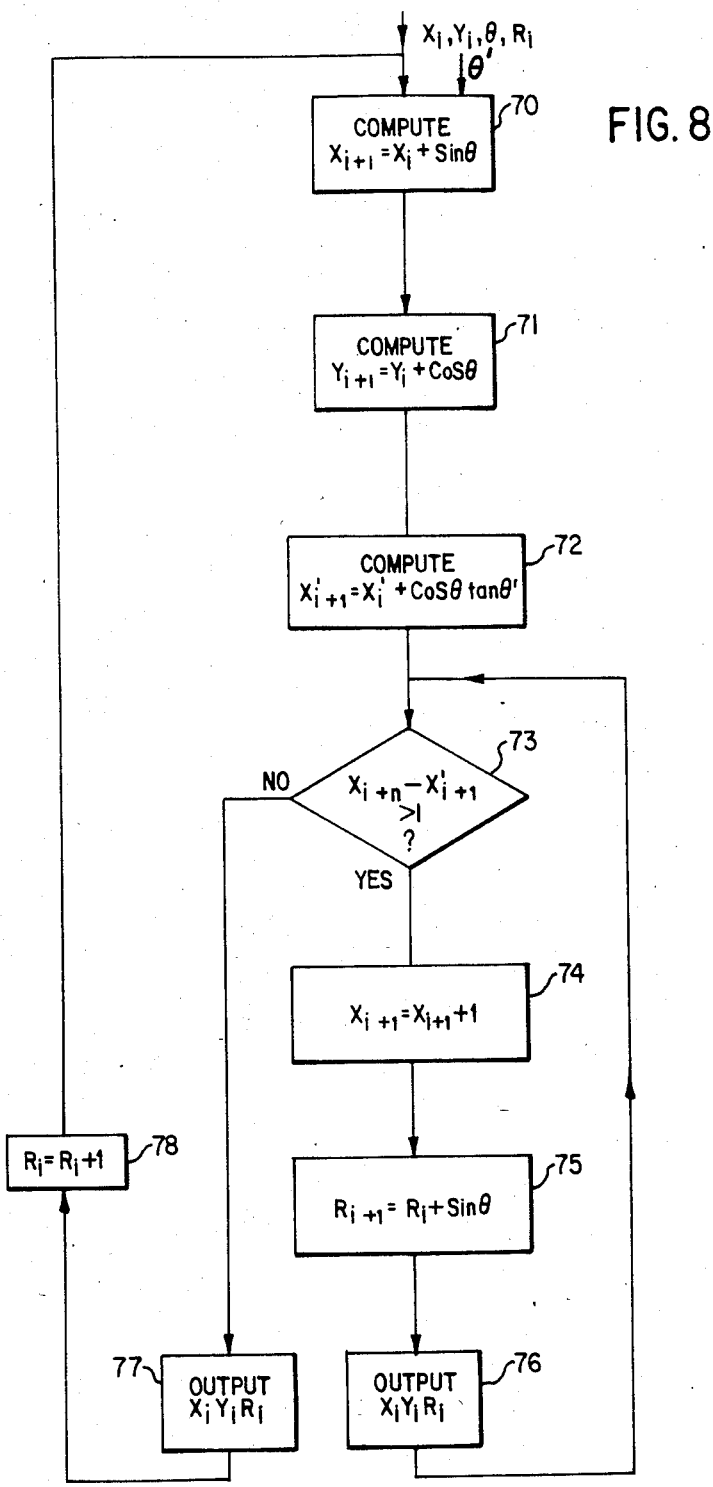
FIG. 8 is a flow chart of the coordinate conversion and fill procedure.

A flow chart of the coordinate conversion and fill operation is shown in FIG. 8 for $\theta < 45°$. Given initial values of $X_i, Y_i, R_i$ and $\theta$, the procedure, for coordinate conversion, calculates subsequent addresses such as $X_{i+1}$ and $Y_{i+1}$ at steps 70 and 71 using equations (5) and (6). The value of $X'_{i+1}$ is then computed at 72 using equation (16), this being the address at which filling is to be stopped as explained above. At 73, $X'_{i+1}$ is subtracted from $X_{i+n}$ and, if the result exceeds 1, a branch is made to 74 and 75 to calculate "fill" addresses $X_{i+1}$ and $R_{i+1}$, after which the new values of $X_i, Y_i$ and $R_i$ are fed back from output 76 to decision element 73. This continues until a NO answer is obtained at 73, when the values of $X_i, Y_i$ and $R_i$ are output at 77, $R_i$ is incremented to $R_i + 1$ at 78, and the procedure begins anew at 70 for the next point on the radial.

Figure 9:
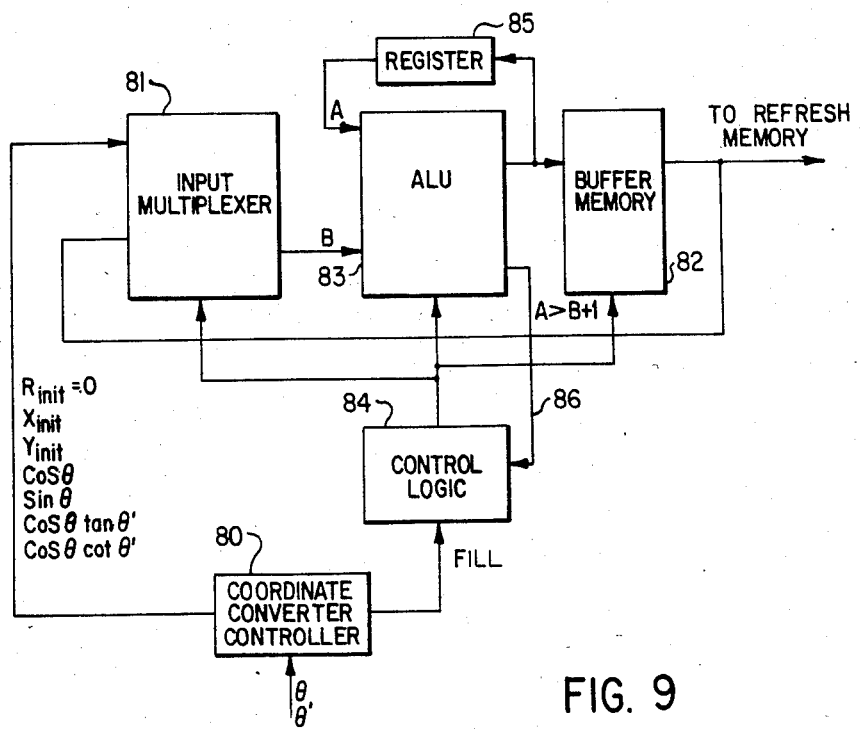
FIG. 9 is a block diagram of a coordinate converter.

The hardware for executing the procedure shown in FIG. 8 is illustrated in FIG. 9.

A Coordinate Converter Controller 80 receives new values of $\theta$ and $\theta'$ corresponding to the radar azimuth at the start of a particular radar transmission period. Controller 80 computes initial values $X_{init}, Y_{init}$ corresponding to the point where the azimuth radial intersects the display raster, and the trigonometric values $\cos\theta$, $\sin\theta$, $\cos\theta\tan\theta'$, $\sin\theta\cot\theta'$. In addition, Controller 80 preferably establishes whether the fill algorithm is to be executed or not. This is desirable since in extreme cases of very large offset and high scan rates, the speed limitations of arithmetic logic hardware may result in the fill process taking longer than the available inter-pulse period of the radar, in which case it must be inhibited.

The Coordinate Converter Controller 80 also initializes control logic 84. Control logic 84 comprises a sequence of microinstructions in ROM for the arithmetic logic unit (ALU) 83 which controls the manipulation of the data in the manner shown in FIG. 8. In FIG. 9 the ALU 83 performs the two functions Add and Compare.

At the beginning of the cycle the initial parameters are stored in a small buffer memory 82, after unaltered passage through the ALU 83, via an input multiplexer 81. Thereafter the arithmetic operations of FIG. 8 are performed sequentially by ALU 83 as ordered by the control logic 84. Data is fetched from the Buffer Memory 82, operated on by the ALU 83, and returned to the Buffer Memory 82. A single word Register 85 allows operations to be performed on 2 operands, one stored in the Register 85 and fetched from the Buffer Memory 82.

The ALU 83 also performs a comparison of the relative sizes of the two Operands, and provides feedback to the control logic 84 via line 86. Depending on the comparison the control logic 84 steers the arithmetic process in the manner shown in FIG. 8. At the appropriate step in this process the comparison check (block 73) results in the control logic 84 transferring to block 77 which outputs data $X_i Y_i R_i$ from the Buffer Memory 82 to the Refresh Memory (FIG. 1).

The embodiments of the invention in which an exclusive property or privilege is claimed are defined as follows:

1. A system for high speed coversion of polar coordinates of radar returns from radially spaced apart radar pulses into cartesian coordinates for storage in a digital memory comprising means for determining an initial $X_i, Y_i$ address corresponding to where a radar pulse crosses a raster display at an angle $\theta_i$, means for determining subsequent addresses $X_{i+1}$ and $Y_{i+1}$ for said pulse by adding constant values $\sin\theta_i$ and $\cos\theta_i$ to $X_i$ and $Y_i$, means for storing data representative of said radar returns at said addresses $X_i$ and $Y_i$, and means for filling said display between adjacent radar pulses at ranges where spoking tends to occur with data related to the data stored at each address $X_i, Y_i$.

2. A system as claimed in claim 1 wherein said means for filling comprises means for sequentially adding constant increments to one cartesian value of one vector until a next vector is reached while maintaining another cartesian value constant.

3. A system as claimed in claim 1, wherein said means for filling comprises means for sequentially addressing a plurality of locations spaced apart along one cartesian axis from a location representing one radar pulse to a location representing a subsequent radar pulse while maintaining a constant value for the address along the other cartesian axis.

4. A system as claimed in claim 3, wherein said locations are spaced apart a constant distance for any two adjacent radar pulses.

5. A system for high speed conversion of polar coordinates of radar returns from radially spaced apart radar pulses into cartesian coordinates for storage in a digital memory comprising means for determining an initial $X_i, Y_i$ address corresponding to where a radar pulse crosses a raster display at an angle $\theta_i$, means for determining subsequent addresses $X_{i+1}$ and $Y_{i+1}$ for said pulse by adding constant values $\sin\theta_i$ and $\cos\theta_i$ to $X_i$ and $Y_i$, means for storing data representative of said radar returns at said addresses $X_i$ and $Y_i$, and means for filling said display between adjacent radar pulses at ranges where spoking tends to occur with data related to the data stored at each address $X_i, Y_i$, said means for filling comprising means for sequentially addressing a plurality of locations spaced apart along one cartesian axis from a location representing one radar pulse to a location representing a subsequent radar pulse while maintaining a constant value for the address along the other cartesian axis, said locations being spaced apart a constant distance for any two adjacent radar pulses, and wherein said distance is $\cos\theta \tan\theta'$ for filling along the x-axis and $r \sin\theta \cot\theta'$ for filling along the y-axis, wherein $\theta$ is the angle between said first radar pulse and the y-axis and $\theta'$ is the angle between said subsequent radar pulse and the y-axis.

6. A system as claimed in claim 5, including means to stop said means for filling at or before an address representing said subsequent radar pulse.

* * * * *